United States Patent [19]

Ochiai et al.

[11] Patent Number: 5,527,085

[45] Date of Patent: Jun. 18, 1996

[54] SUNROOF DEVICE FOR VEHICLE

[75] Inventors: Hironori Ochiai, Chiryu; Akitoshi Sometani, Okazaki, both of Japan

[73] Assignee: Aisin Seiki Kabushiki Kaisha, Japan

[21] Appl. No.: 274,137

[22] Filed: Jul. 12, 1994

[30]      Foreign Application Priority Data

Jul. 13, 1993 [JP] Japan .................... 5-173426

[51] Int. Cl.⁶ ........................................... B60J 7/05
[52] U.S. Cl. ............................. 296/223; 296/221
[58] Field of Search ........................ 296/221–224

[56] References Cited

U.S. PATENT DOCUMENTS

| | | | |
|---|---|---|---|
| 4,699,421 | 10/1987 | Schaetzler | 296/221 |
| 5,066,068 | 11/1991 | Suzuki et al. | 296/221 |
| 5,257,849 | 11/1993 | Cheron et al. | 296/223 |
| 5,275,461 | 1/1994 | Cheron et al. | 296/216 |
| 5,280,992 | 1/1995 | Cheron et al. | 296/223 |

FOREIGN PATENT DOCUMENTS

| | | |
|---|---|---|
| 3146697 | 6/1982 | Germany . |
| 3423143 | 1/1985 | Germany . |
| 3715268 | 1/1988 | Germany . |
| 55-15325 | 4/1980 | Japan . |
| 64-22621 | 1/1989 | Japan . |
| 1-148916 | 10/1989 | Japan . |
| 2090565 | 7/1982 | United Kingdom . |
| 2144174 | 2/1985 | United Kingdom . |
| 2193996 | 2/1988 | United Kingdom . |

*Primary Examiner*—Dennis H. Pedder
*Attorney, Agent, or Firm*—Finnegan, Henderson, Farabow, Garrett & Dunner

[57] ABSTRACT

A sunroof device for a vehicle includes a guide rail fixed on a roof panel of the vehicle, a movable panel for opening and closing an opening disposed on the roof panel and which is mounted on the guide rail through a link mechanism, wherein the link mechanism includes a lift link connected with one of the guide rail and the movable panel and a guide link connected with the other one of the guide rail and the movable panel, and wherein the guide link includes a first guide groove and a second guide groove both of which are disposed on a side thereof which is opposite to the lift links and the first guide groove and the second guide groove are at different depths from each other in the guide link, and wherein the lift link includes a first guide pin and a second guide pin both of which are projected on a side thereof which is opposite to the guide link, and each of the first guide pin and the second guide pin is engaged with the first guide groove and the second guide groove respectively and the first guide pin and the second guide pin have different lengths corresponding to the difference in depth between the first guide groove and the second guide groove.

5 Claims, 6 Drawing Sheets

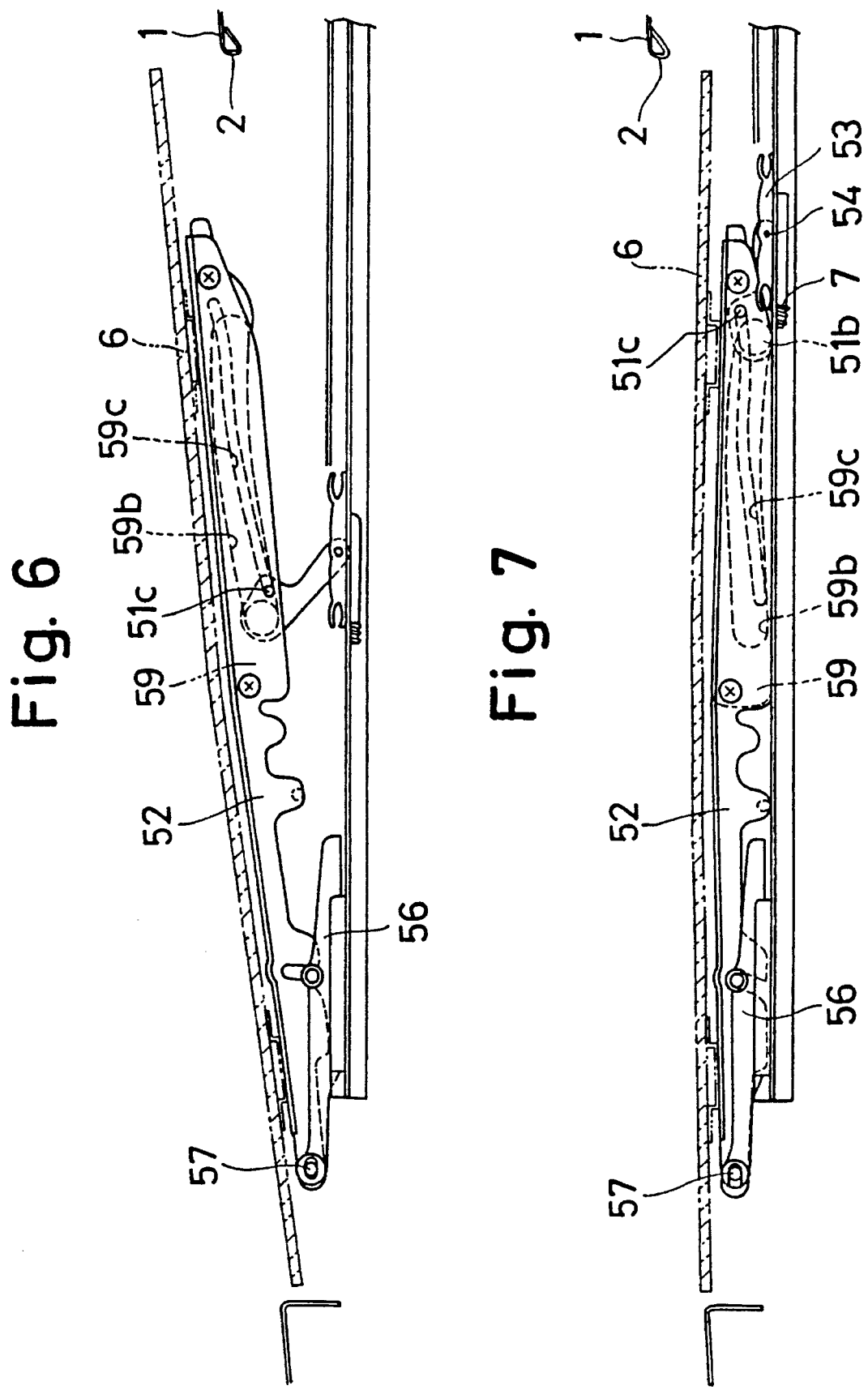

SUNROOF DEVICE FOR VEHICLE

BACKGROUND OF THE INVENTION

1. Field of the invention

This invention relates to a sunroof device for a vehicle.

2. Description of the Related Art

A conventional sunroof device for a vehicle is disclosed in the Japanese Patent Laid Open No. 64 (1989)-22621. The sunroof device for a vehicle disclosed in the prior art comprises a guide rail fixed on a roof panel so as to be located near a circumferential portion of an opening disposed on the roof panel. The sunroof device for a vehicle comprises a movable panel supported on the guide rail through a link mechanism in order that the movable panel may open and close the opening through an operation of the link mechanism. The link mechanism includes a guide link slidably supported on the guide rail and a lift link pivotably supported on the movable panel. The lift link includes a first guide pin and a second guide pin each of which is projected in the respective sides from the lift link so as to form a triangle with a supporting axis which supports the lift link through both sides thereof. The guide link includes a first guide groove and a second guide groove each of which is formed on the respective sides of the guide link. Each of the first and second guide pins is slidably fit through the first and second guide grooves respectively so as to connect the lift link with the guide link. The engagement of the lift link and the guide link is utilized for restricting the position of the movable panel when the movable panel is moved.

Another conventional sunroof device for a vehicle is disclosed in the Japanese Patent No. 55 (1980)-15325. The sunroof device for a vehicle disclosed in the prior art comprises a guide rail fixed on a roof panel so as to be located near a circumferential portion of an opening disposed on the roof panel. The sunroof device for a vehicle comprises an movable panel supported on the guide rail through a link mechanism in order that the movable panel may open and close the opening through an operation of the link mechanism. The link mechanism includes a guide link slidably supported on the guide rail and a lift link pivotably supported on the movable panel. The lift link includes a first guide pin and a second guide pin each of which is projected from one side of the lift link so as to form a triangle with a supporting axis which supports the lift link through both sides thereof. The guide link includes a guide groove which is formed on one side of the guide link which is opposite to the lift link. Each of the first and second guide pins is slidably fit through the guide groove respectively so as to connect the lift link with the guide link. The engagement of the lift link and the guide link is utilized for restricting the position of the movable pane 1 when the movable panel is moved.

However in accordance with the former prior art as shown in FIG. 10, because the lift link B3 is supported on the guide link through respective sides of the lift link (the engagement of each of the first and second guide pins B1, B2 and the first and second guide grooves), an action line B (the line connecting the centers of gravity of the first and second guide pins B1, B2) of the force applied to the lift link B3 is rather inclined relative to the supporting axis B4 supporting the lift link B3 when the movable panel receives the force. Therefore, leverage including a long span is generated at the lift link B3. The lift link B3 is inclined because a large moment is generated at the supporting axis B4. Consequently, the lift link B3 interferes with the guide link so as to have an uneven abrasion and an operational noise.

In accordance with the latter prior art, the guide groove has to be separated into two portions or the guide groove has to be extended in the vertical direction since both of the guide pins are engaged with one guide groove. Therefore, the guide link has to be enlarged and the sunroof device for a vehicle has to be heavy in weight. In particularly, when the guide groove is extended in the vertical direction, a clearance between a passenger head and the vehicle roof is decreased.

SUMMARY OF THE PRESENT INVENTION

It is an object of the present invention to provide a sunroof device for a vehicle which can prevent the inclination of a lift link when a force is applied to the movable panel.

It is another object of the present invention to provide a sunroof device for a vehicle which is convenient to be manufactured.

It is a further object of the present invention to provide a sunroof device for vehicle which is durable.

It is a further object of the present invention to provide a sunroof device for a vehicle which is simple in structure and small in size.

It is a further object of the present invention to provide a sunroof device for a vehicle which is low in cost.

To achieve the above mentioned objects, a sunroof device for a vehicle in accordance with this invention comprises a guide rail for attachment to a roof panel of the vehicle, a movable panel, and a link mechanism disposed between the guide rail and the movable panel for opening and closing the opening with the movable panel; the link mechanism including; a lift link connected to one of the guide rail and the movable panel, a guide link connected to the other of the guide rail and the movable panel and having a side face opposed to the lift link, a first continuous cam groove formed in the side face of the guide link and having a first depth, a second continuous cam groove formed in the side face of the guide link and having a second depth different from the first depth, a first guide pin provided in the lift link facing in a direction toward the side face and engaging the first cam groove and having a first length, a second guide pin provided in the lift link facing in the same direction as the first guide pin and engaging the second cam groove and having a second length different from the first length, the difference in length corresponding to the difference in depth between the first and second depths.

BRIEF DESCRIPTION OF THE DRAWINGS

The features and advantages of the sunroof device for a vehicle according to the present invention will be more clearly appreciated from the following description in conjunction with the accompanying drawings wherein:

FIG. 6 is a longitudinal sectional view of a movable panel under a tilting position for a sunroof device of the present invention corresponding to FIG. 2;

FIG. 7 is a longitudinal sectional view of a movable panel in the rearward sliding position for a sunroof device of the present invention corresponding to FIG. 2;

DETAILED DESCRIPTION OF PREFERRED EMBODIMENTS OF THE INVENTION

Figure 1:
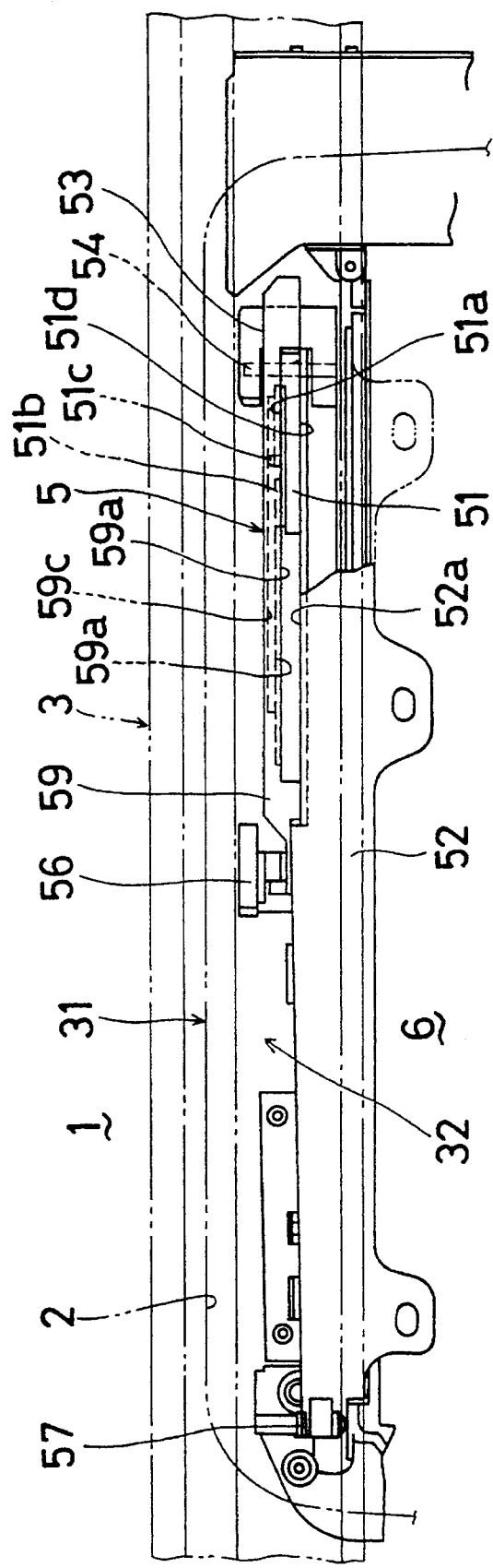
FIG. 1 is a plan view of a sunroof device of the present invention.

Referring to the FIG. 1, a roof panel 1 includes an opening 2. A pair of guide rails 3 (one of them is shown in the FIG. 1) are fixed on the roof panel 1 so as to be located at both sides of the opening 2. The guide rails 3 are connected with a front frame (not shown in the FIGURES) disposed at a front side of the opening 2 so as to form a frame. A movable panel 6 is supported on the guide rails 3 through a link mechanism 5 (described later) so as to open and close the opening 2 by the operation of the link mechanism 5.

Figure 3:
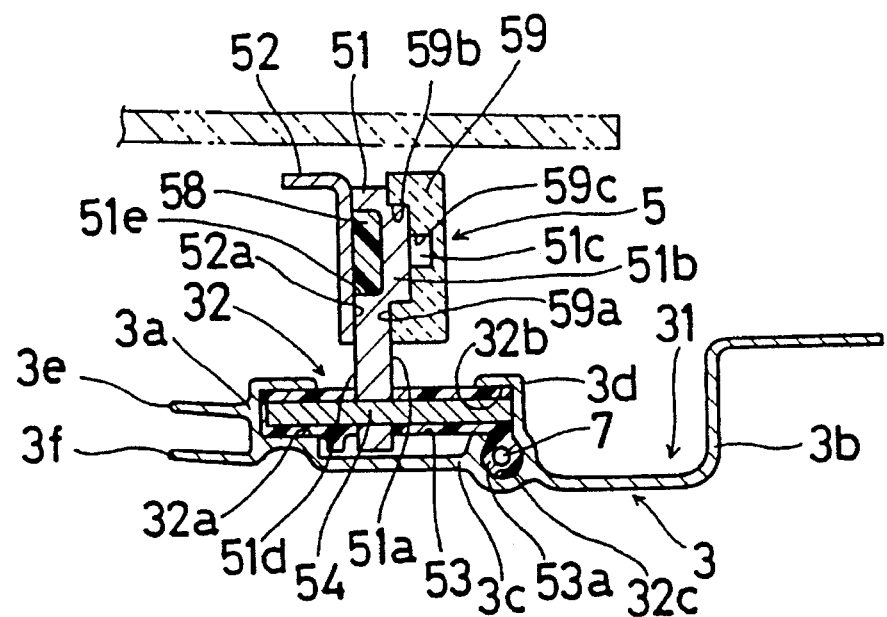
FIG. 3 is a cross sectional view of FIG. 1 of a sunroof device of the present invention.

The guide rail 3 is extended in the front and rear direction of the vehicle. As shown in the FIG. 3, the guide rail 3 includes side walls 3a, 3b spaced apart a given width and a bottom wall 3c and the guide rail 3 is substantially formed in a box-shaped configuration. A wall portion 3d disposed on the bottom wall 3c is projected in the upper direction so as to be parallel to the side walls 3a, 3b. The wall portion 3d is extended in the longitudinal direction of the guide rail 3 in order that the guide rail 3 is separated into a gutter portion 31 located outside of the vehicle cabin and a rail portion 32 located inside of the vehicle cabin.

Each of the side wall 3a and the wall portion 3d includes guide grooves 32a, 32b which are disposed inside of the rail portion 32 so as to be extended in the longitudinal direction of the rail portion 32 respectively. Further, the wall portion 3d includes a cable groove 32c disposed inside of the rail portion 32 so as to be extended in the longitudinal direction of the rail portion 32. On the other hand, a pair of flange portions 3e, 3f are integrally formed on the side wall 3a which are disposed outside of the rail portion 32 so as to be extended in the longitudinal direction of the guide rail 3. The flange portions 3e, 3f are projected in the inside direction of the vehicle cabin in order that a sunshade panel (not shown in the FIGURES) is slidably supported therebetween. The guide rail 3 is made of an aluminum material by an extrusion molding.

As shown in the FIGS. 1 to 5, the link mechanism 5 including a lift link 51 and a supporting link 52 is disposed on the rail portion 32. One end of the lift link 51 is pivotably supported on a rear shoe 53 slidably disposed between the guide grooves 32a, 32b by a pin 54. The rear shoe 53 includes a foot portion 53a fit into the cable groove 32c. The foot portion 53a is connected with a cable 7 which connected to a driving mechanism (not shown in the FIGURES) and which is slidably disposed in the cable groove 32c. The supporting link 52 is extended in the longitudinal direction of the guide rail 3 so as to retain the movable panel 6. A front end of the supporting link 52 is supported on a front shoe 56 slidably disposed in the guide groove 32a by a pin 57.

Figure 5:
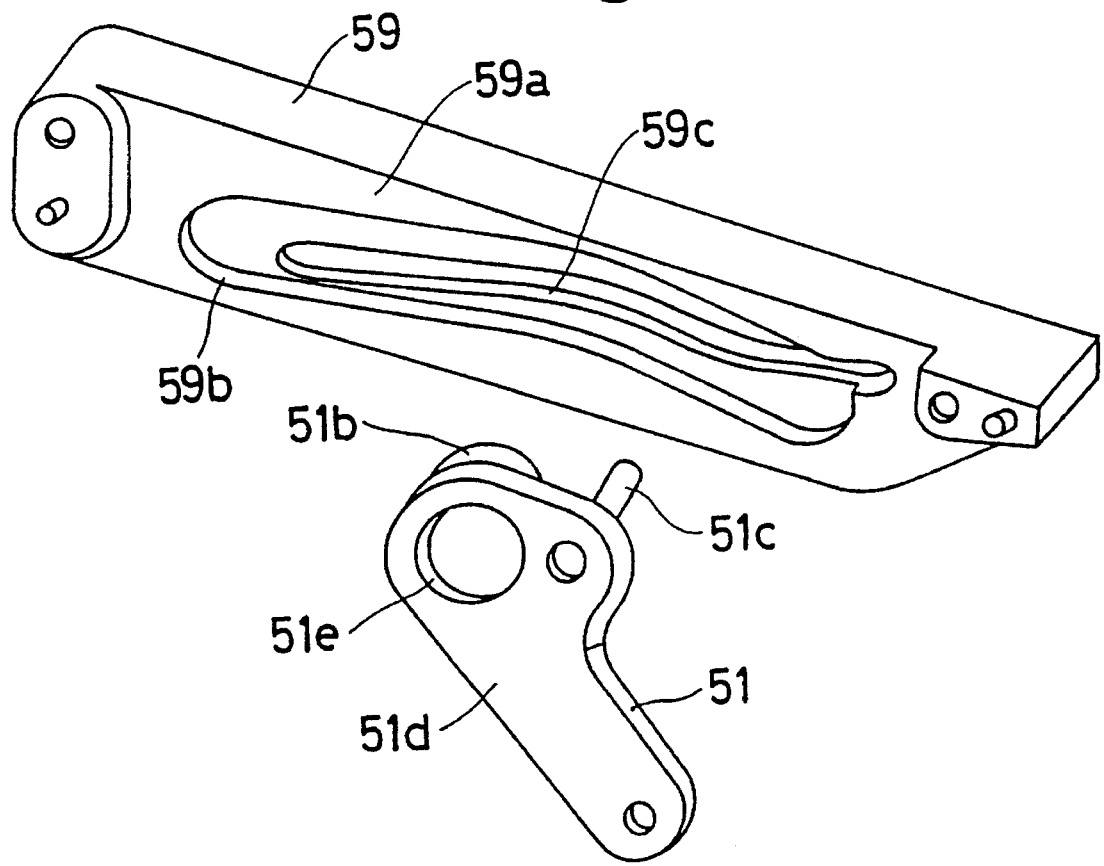
FIG. 5 is a partly enlarged perspective view of a guide block and lift link for a sunroof device of the present invention.
Figure 4:
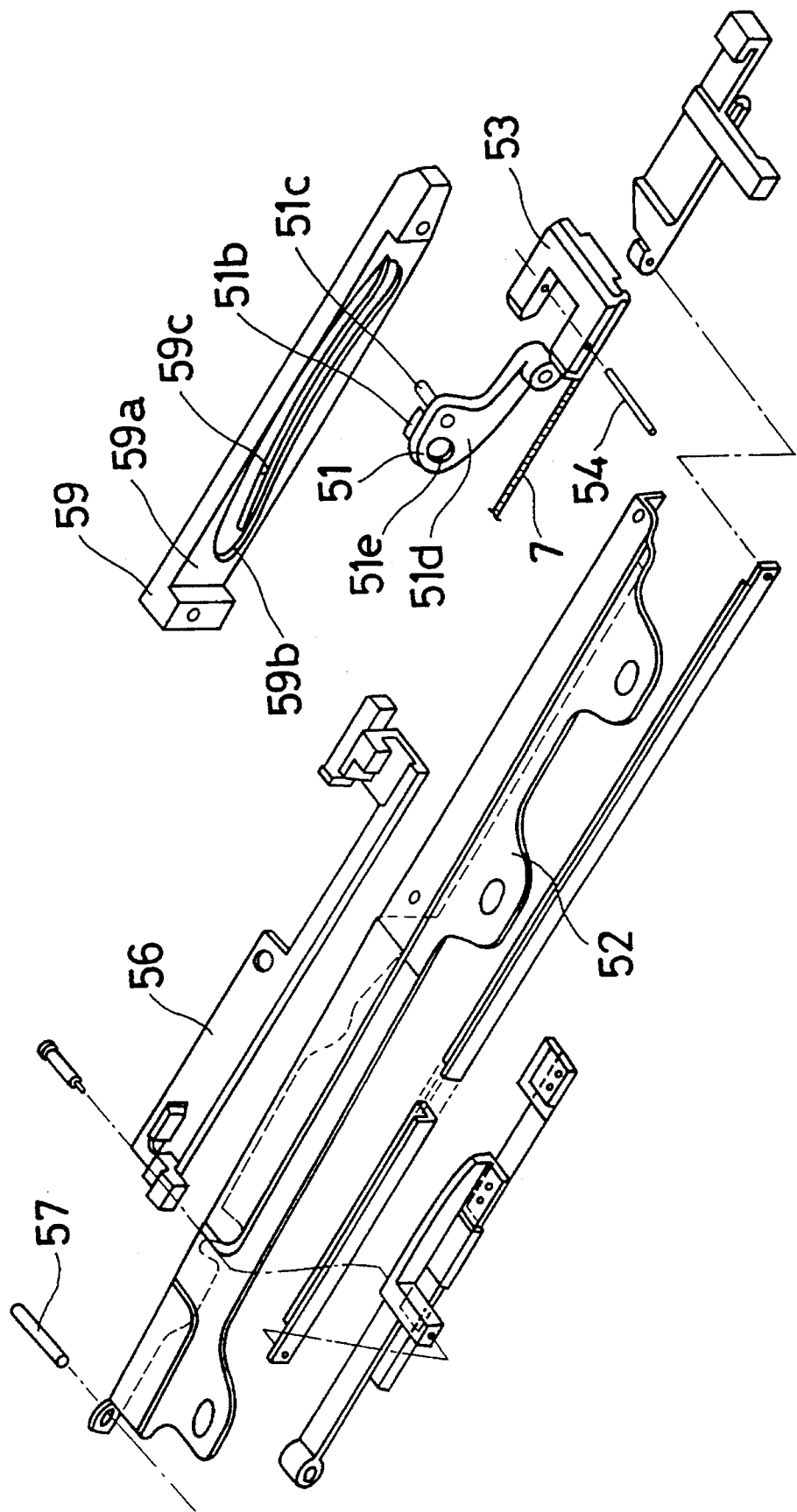
FIG. 4 is an exploded view in perspective of a link mechanism of a sunroof device of the present invention.

A guide block 59 is fixed at a side 52a located at the rear end of the supporting link 52 and outside of the vehicle cabin so as to form a space between the side 52a and the guide block 59. A side 59a of the guide block 59 located inside of the vehicle cabin so as to be opposite to the side 52a includes a first guide groove 59b and a second guide groove 59c. As shown in FIG. 5, the second guide groove 59c is provided to be more distant from the side 59a than the first guide groove 59b. That is to say, the locations of the first guide groove 59b and the second guide groove 59c are at different depths in the guide block 59 with respect to the side 59a. Each of the first guide groove 59b and the second guide groove 59c is extended in the longitudinal direction of the supporting link 52 and is formed in a Cam-shaped configuration which is bent in the vertical direction.

The first guide groove 59b and the second guide groove 59c include an intersecting point at which center lines of the first guide groove 59b and the second guide groove 59c cross each other. Further, the width of the first guide groove 59b is larger than that of the second guide groove 59c. Because the center lines of the guide grooves 59b, 59c intersect each other as mentioned above, the movable panel 6 can be operated to be tilted up and slid down without enlarging the guide block 59. Consequently, the sunroof device for a vehicle can be small in size and light in weight. In particular, the clearance between the passenger head and the vehicle roof is not decreased since the guide grooves 59b, 59c intersect each other in order that the vertical scale of the guide block 59 is not increased.

The other end of the lift link 51 is located in a space between the supporting link 52 and the guide block 59. A side 51a of the lift link 51 which is located outside of the vehicle cabin so as to be opposite to the side 59a of the guide block 59 includes a first guide pin 51b and a second guide pin 51c. The first and second guide pins 51b, 51c are formed into a triangle with the pin 54. The length of the first guide pin 51b is smaller than that of the second guide pin 51c and the diameter of the first guide pin 51b is larger than that of the second guide pin 51c.

In accordance with the above structure, each of the guide pins 51b, 51c slidably fit into the guide grooves 59b, 59c respectively so as to be guided thereby. The movable panel 6 is positioned and supported on the rear shoe 53. The movable panel 6 is steady retained since the movable panel 6 is supported by the guide pins 51b, 51c and the pin 54 that form the triangle with each other. A concave portion 51e is formed on a side 51d of the lift link 51 which is located toward the inside of the vehicle cabin where the first guide pin 51b is formed on the side 51a. An elastic member 58 which is contacted with the side 52a of the supporting link 52 is disposed in the concave portion 51e. Therefore, the lift link 51 is pressed by the supporting link 52 and the guide block 59 so as to be prevented from falling down.

Further, the supporting link 52 may be supported on the rear shoe 53 instead of the lift link 51 and the lift link 51 may be connected with the movable panel 6 instead of the supporting link 52. Furthermore, each location of the guide block 59 and the supporting link 52 with respect to the lift link 51 may be reversed. (The guide block 59 may be located inside of the vehicle cabin with respect to the lift link 51.)

Figure 2:
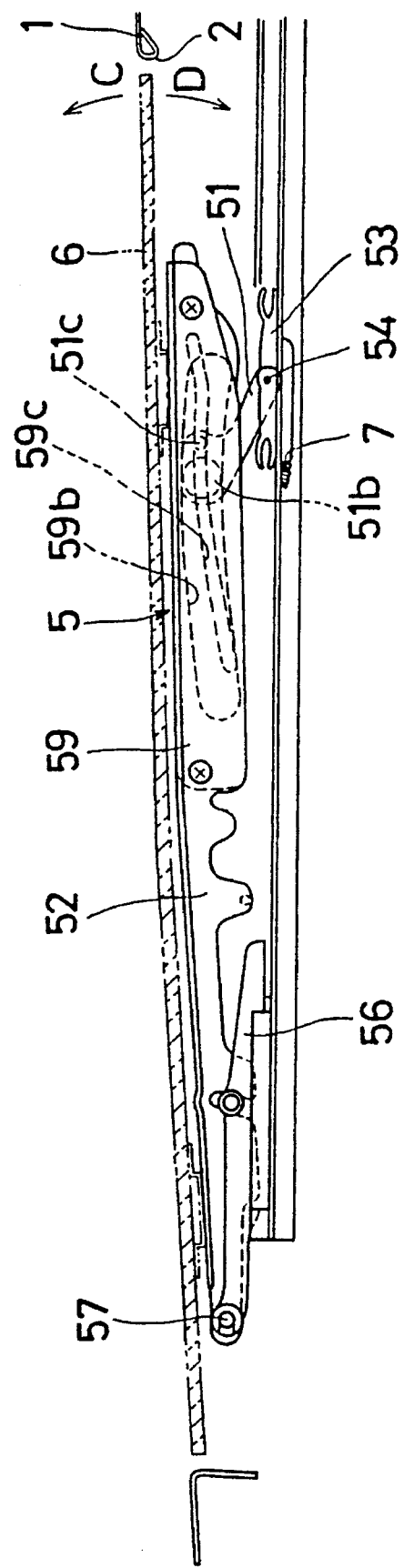
FIG. 2 is a longitudinal sectional view of the FIG. 1 of a sunroof device of the present invention.

The operation of the sunroof device for a vehicle will be described hereinafter. The link mechanism 5 is shown in FIG. 2 when the movable panel 6 closes the opening 2. When the driving mechanism is driven so as to slide the rear shoe 53 in the front direction of the vehicle along the guide grooves 32a, 32b through action of the cable 7, each of the guide pins 51b, 51c is moved in the guide grooves 59b, 59c respectively. Therefore, the second guide pin 51c is moved in the second guide groove 59c which bends in a lower direction. At this moment, each of the guide pins 51b, 51c is definately moved in the guide grooves 59b, 59c respectively since the length and the diameter of the guide pins 51b, 51c are different from each other. Because the lift link 51 is rotated about the pin 54 in the clockwise direction shown in FIG. 2 by a cam operation of the second guide groove 59c so as to be stood up with respect to the guide rail 3, the supporting link 52 is also rotated about the pin 57 in the C direction shown in the FIG. 2 according to the rotation of the lift link 51. At this time, the supporting link 52 is not prevented from being rotated since the front shoe 56 is prevented from being slid along the guide groove 32b by a check mechanism which is conventional. Consequently, the movable panel 6 is tilted up so as to open the opening 2 (see FIG. 6).

under the condition shown in the FIG. 2, when the driving mechanism is driven in the counter direction relative to the direction above mentioned so as to slide the rear shoe 53 in the rear direction of the vehicle along the guide grooves 32a, 32b through action of the cable 7, each of the guide pins 51b, 51c is again moved in the guide grooves 59b, 59c. Therefore, the second guide pin 51c is moved in the second guide groove 59c which bends in the upper direction. Because the lift link 51 is rotated about the pin 54 in the counter clockwise direction shown in FIG. 2 by the cam operation of the second guide groove 59c so as to be directed down with respect to the guide rail 3, the supporting link 52 is also rotated about the pin 57 in the D direction shown in the FIG. 2 according to the rotation of the lift link 51. At this time, the supporting link 52 is not prevented from being rotated since the front shoe 56 is prevented from being slid along the guide groove 32b by the check mechanism. Consequently, the movable panel 6 is moved downwardly so as to be in a sliding position (see FIG. 7). At this time the front shoe 56 is permitted to be slid along the guide groove 32b by an operation of the check mechanism. When the driving mechanism continues to be driven, the rear shoe 53 and the front shoe 56 are slid in the rear direction of the vehicle along the guide grooves 32a, 32b. Therefore, the movable panel 6 also is slid while maintaining the sliding position so as to open the opening 2.

When the rear shoe 53 is slid in the counter direction relative to the direction next above mentioned along the guide grooves 32a, 32b, the movable panel 6 closes the opening 2.

Figure 8:
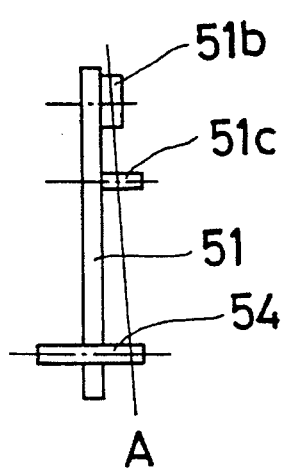
FIG. 8 is a schematic view of a lift link of a sunroof device of the present invention for explaining the operation of the invention.
Figure 10:
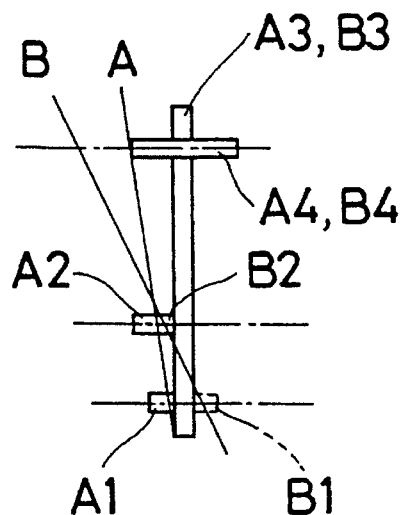
FIG. 10 is a schematic view of a lift link of a sunroof device of the present invention for explaining the operation of the invention and the prior art.

As shown in FIG. 8, when force is applied to the movable panel 6, a large moment is not generated at pin 54 since the lift link 51 is supported on the guide block 59 at the side 51a only so as to prevent the action line A of the force applied to the lift link 51 from being extremely inclined relative to the pin 54 and so as to make the distance of the leverage generated at the lift link 51 short. The force applied to the movable panel 6 is transmitted to the rear shoe 53 through the supporting link 52, the guide block 59 and the lift link 51 and is supported by the guide rail 3. As mentioned above, since a large moment is not generated at the pin 54, the lift link 51 is not extremely inclined. Therefore, the supporting link 52 and the lift link 51 do not interfere with each other. Consequently, the lift link 51 can be prevented from having uneven abrasion and operational noise.

Figure 9:
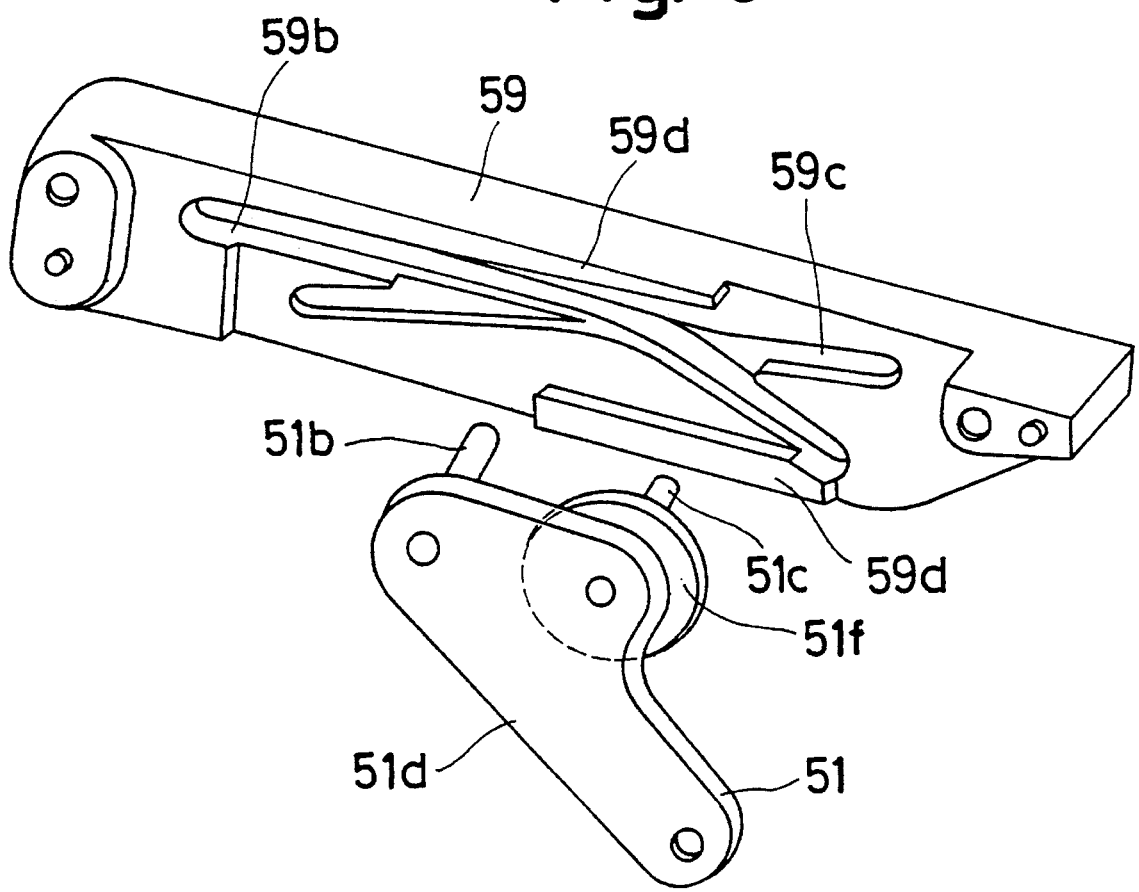
FIG. 9 is a partly enlarged perspective view of an alternate embodiment of a guide block and lift link for a sunroof device of the present invention corresponding to FIG. 5.

As shown in FIG. 9, the diameter of the second guide pin 51c may be equal to that of the first guide pin 51b. In this alternate embodiment, the guide block 59 includes wall portions 59d disposed near the intersecting point of the guide grooves 59b, 59c and further the lift link 51 includes a guide portion 51f guided by the wall portions 59d in order that the second guide pin 51c does not slid into the first guide groove 59b which in this embodiment is of greater depth than groove 59c.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A sunroof device for a vehicle comprising:

a guide rail for attachment to a roof panel of the vehicle, a movable panel, and a link mechanism disposed between the guide rail and the movable panel for opening and closing the opening with the movable panel; the link mechanism including:

a lift link connected to one of the guide rail and the movable panel, a guide link connected to the other of the guide rail and the movable panel and having a side face opposed to the lift link, a first continuous cam groove formed in the side face of the guide link and having a first depth defined between the side face and a bottom of the first groove, a second continuous cam groove formed in the side face of the guide link and having a second depth defined between the side face and a bottom of the second groove, the second depth different from the first depth, a first guide pin provided in the lift link facing in a direction toward the side face and engaging the first cam groove and having a first length, a second guide pin provided in the lift link facing in the same direction as the first guide pin and engaging the second cam groove and having a second length different from the first length, the difference in length corresponding to the difference in depth between the first and second depths.

2. A sunroof device as set forth in claim 1, wherein the first cam groove and the second cam groove intersect.

3. A sunroof device as set forth in claim 1, wherein the first guide pin has a diameter different from that of the second guide pin.

4. A sunroof device as set forth in claim 1, wherein the first guide pin has a diameter equal to that of the second guide pin.

5. A sunroof device as set forth in claim 1, further comprising a rear shoe and wherein the link mechanism includes a pivot pin by which the lift link is pivotally attached to the rear shoe, the pivot pin, the first guide and the second guide pin defining a triangular array.

\* \* \* \* \*